Patented June 28, 1938

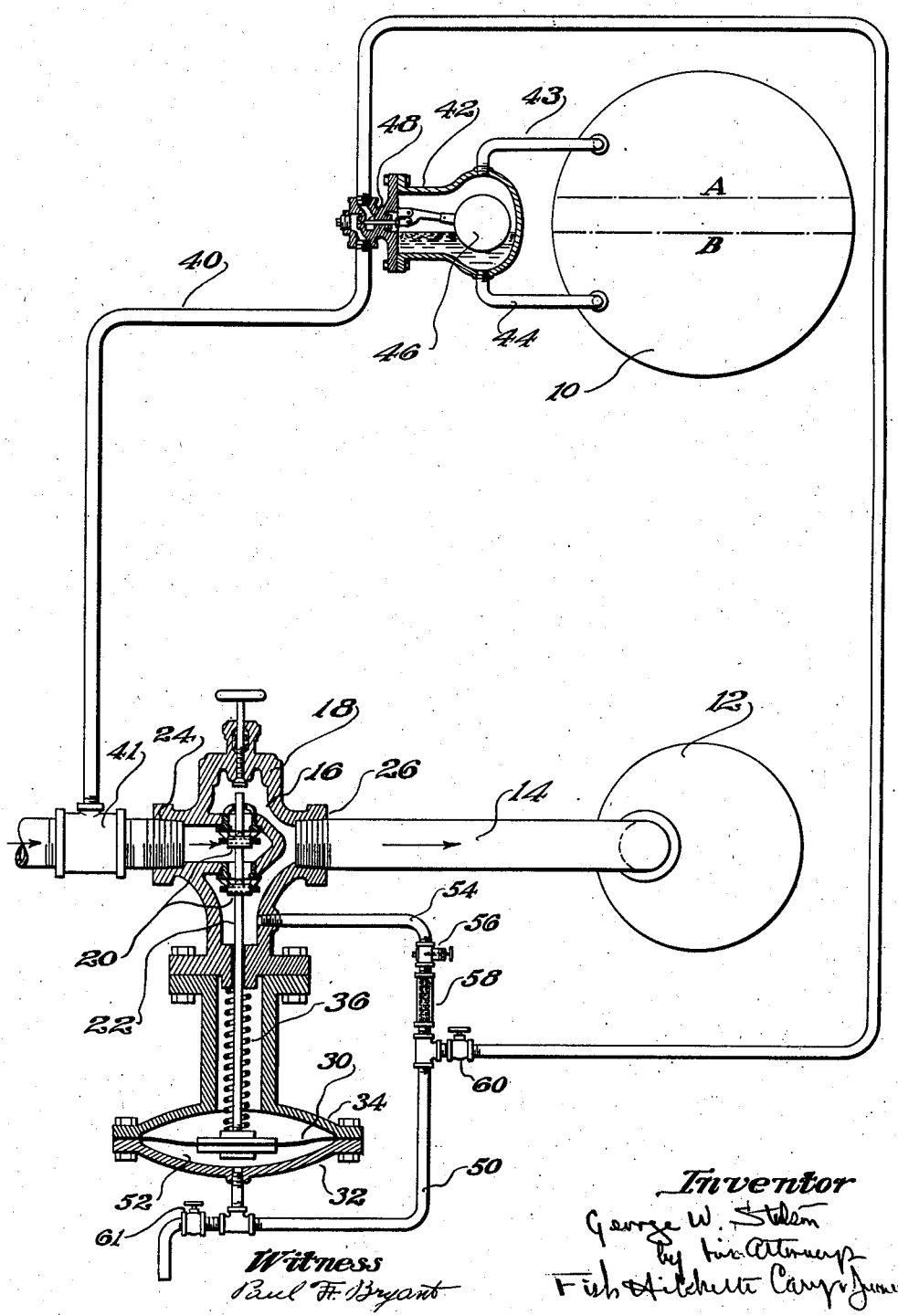

2,121,891

UNITED STATES PATENT OFFICE 2,121,891

LIQUID LEVEL REGULATOR

George W. Stetson, Hingham, Mass.

Application September 6, 1935, Serial No. 39,413

1 Claim. (Cl. 137—101)

The present invention relates to liquid level regulators and is more particularly concerned with regulators of this type designed for controlling the feeding of a liquid supply to high pressure receptacles such as boilers and the like.

It will be obvious to those skilled in the art that various manners of controlling the supply to a steam boiler for the purpose of maintaining a substantially constant level within the boiler have been practically used. These methods comprise regulators operated directly or through pilot mechanism and controlled through a level actuated float, also regulators operating upon the thermostatic principle and depending upon the relative height of the steam and water spaces.

In modern power plant equipment and for certain other purposes it is desirable to provide a controlling system which permits the location of the feed valve independently of the level to be maintained, and it is the purpose of the present invention to provide a simple and efficient form of regulator which permits the location of the feed valve at the most convenient point in the supply line and controls the operation of this valve in accordance with the liquid level without requiring the use of power other than that available from the supply line pressure.

With this and other purposes in mind I have devised a regulating system comprising essentially a feed valve interposed in the liquid supply line and having a substantial pressure drop between inlet and outlet sides and a liquid control circuit communicating with the supply line at opposite sides of the feed valve and having a variable rate of flow therethrough controlled by the liquid level to be maintained. Variation in the rate of flow varies the pressure drop through the control line, and this variation in pressure drop is utilized to operate the feed valve through a piston or its equivalent subjected at opposite sides to the pressure in the control line and the pressure in the supply line at the outlet side of the feed valve.

The accompanying drawing illustrates the application of the regulator system to a steam boiler installation.

In this illustrated embodiment of the invention, a steam boiler of the type employed for relatively high pressures may be provided with an elevated water level drum indicated at 10, and a lower mud drum 12 into which leads a supply line 14. The supply line is provided with a feed valve 16 having a valve casing 18 and feed valves 20, which may be disk, sleeve or piston valves operated from a valve stem 22 extending downwardly through the lower portion of the casing. The supply line leads into the valve casing at 24 and takes off from the casing at 26.

In this type of valve a substantial pressure drop exists between the inlet and the outlet sides of the valve. For example, if the pressure at the inlet side of the valve approximates 450 to 475 lbs., the pressure at the outlet side may approximate 400 lbs. The valve stem 22 at its lower end is connected with a flexible diaphragm 30 clamped in the casing parts 32 and 34. The valve stem is normally impelled into a position in which the valve is full open by a compression spring 36.

Control of the valve is accomplished by a liquid control line at the inlet side through a fitting 41 and with the supply line at the outlet side connecting directly with the valve casing 18. The control line has interposed therein a regulating valve 42 which is connected with the steam and water spaces of the drum 10 by connections 43 and 44. A float 46 mounted within the valve operates a needle valve 48 or the like to impose a variable restriction upon the flow of water through the line 40. The control line beyond the valve 42 is connected through 50 with the space 52 at the under side of the diaphragm. The connection with the outlet side of the feed valve is through a line 54 having an adjustable restricted orifice 56 and a strainer 58 therein.

Under normal conditions with equal pressures existing on opposite sides of the diaphragm, the feed valve is impelled both by the normal pressure differential and by the spring 36 into the position shown, in which the valve is open. When the liquid level is shown at the line B, the float maintains the needle valve 48 closed and a reduced pressure exists in the control line beyond the valve, allowing the diaphragm to maintain the position shown in the drawing. As the level rises to A, the valve is opened to a point where the pressure throughout the line 40 becomes equalized and the pressure at the under side of the diaphragm assumes the order of the pressure at the inlet side of the feed valve, which may approximate 450 lbs. in a given installation. In the meantime the pressure at the opposite side of the diaphragm approximates that at the outlet side of the valve, on the order of 400 lbs., and the difference in pressure with the diaphragm shown is sufficient to close the feed valve against the spring and any differential existing in the valve, thus cutting off the supply of water to the boiler. As water is used the level drops and the cycle is resumed. The restriction in the line 54 is such as to prevent reduction of pressure below the diaphragm, but still permits the surplus of water flowing through the line to be discharged directly into the supply beyond the feed valve, thus avoiding any wastage of water or any venting of water which requires repumping.

The valves 60 and 61 serve for cleaning out the control line when necessary. In ordinary practice the valve 61 is closed and the valve 60 is open, thus making the control circuit virtually a closed circuit bypassing the feed valve from the supply.

It will be evident that with this construction the source of power is the pressure drop over the feed valve, and that no additional or external source of power is required either for the operation of a separate pilot or for the operation of the main feed valve itself. Furthermore, there is no interference with the direct flow of water to the boiler through the main feed valve, nor any restriction in the supply line which might otherwise interfere. Failure of the system to function due to rupture of the diaphragm or other causes, induces the feed valve to go to full open position and avoids any cessation of supply.

Although the system is shown in connection with the control of steam boilers, nevertheless it will be understood that it will serve equally well for the supply of any liquid receptacle where the pressures involved are sufficient to employ a substantial pressure drop or differential across the feed valve. Furthermore, although the regulation of the liquid control line is accomplished as indicated by a float level, any means of variably restricting the line through the liquid level itself will serve equally well.

What is claimed is:

A liquid level regulator, comprising a liquid receptacle, a supply line, a feed valve in the supply line, a means for actuating the feed valve exposed at one end to the pressure at the discharge side of the feed valve, a control circuit communicating with the supply line at the inlet side of the feed valve and at the end of said means opposite the discharge of the feed valve, a liquid level control valve for regulating flow through the control circuit from the supply line to said means, and an adjustable restricted vent between the control circuit and the discharge passage for the feed valve to govern the pressure imposed upon said means through the control circuit.

GEORGE W. STETSON.